United States Patent
Lei

(10) Patent No.: US 7,856,151 B2
(45) Date of Patent: Dec. 21, 2010

(54) METHOD FOR EDGE-BASED MULTI RATE IMAGE SHARPNESS ENHANCEMENT

(75) Inventor: Zhichun Lei, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 1060 days.

(21) Appl. No.: 11/563,077

(22) Filed: Nov. 24, 2006

(65) Prior Publication Data

US 2007/0189630 A1 Aug. 16, 2007

(30) Foreign Application Priority Data

Feb. 15, 2006 (EP) .................................. 06003044

(51) Int. Cl.
- G06K 9/40 (2006.01)
- G06K 9/48 (2006.01)
- G06K 9/36 (2006.01)
- G06K 9/46 (2006.01)
- H04B 1/66 (2006.01)

(52) U.S. Cl. ...................... 382/266; 382/199; 382/240; 382/263; 382/265; 375/240

(58) Field of Classification Search ........................ None
See application file for complete search history.

(56) References Cited

U.S. PATENT DOCUMENTS

| | | | | |
|---|---|---|---|---|
| 5,461,655 A | * | 10/1995 | Vuylsteke et al. | 378/62 |
| 2001/0024531 A1 | | 9/2001 | Edgar | |
| 2006/0077470 A1 | * | 4/2006 | Saquib | 358/3.28 |

FOREIGN PATENT DOCUMENTS

| EP | 0 527 525 A2 | 2/1993 |
|---|---|---|
| EP | 1 339 224 A1 | 8/2003 |
| EP | 1 439 489 A2 | 7/2004 |

OTHER PUBLICATIONS

Bruno Aiazzi, et al., "Wavelet and multirate denoising for signal-dependent noise," Proceedings of the SPIE, vol. 4119, 2000, pp. 843-852, XP-002379939.

* cited by examiner

Primary Examiner—Anand Bhatnagar
Assistant Examiner—Randolph Chu
(74) Attorney, Agent, or Firm—Oblon, Spivak, McClelland, Maier & Neustadt, L.L.P.

(57) ABSTRACT

The present invention relates to a method for processing digital image data (ID), wherein the process of multi rate, multi resolution and/or multi scale signal processing is involved in order to realize a respective multi rate, multi resolution and/or multi scale sharpness enhancement with respect to said image data (ID).

32 Claims, 8 Drawing Sheets

METHOD FOR EDGE-BASED MULTI RATE IMAGE SHARPNESS ENHANCEMENT

FIELD OF THE INVENTION

The present invention relates to a method for processing digital image data. More particular, the present invention in particular also relates to a method for edge-based multi rate image sharpness enhancement.

BACKGROUND OF THE INVENTION

In many applications and customer devices where image processing is involved there is a need to enhance the sharpness of an image. However, in most cases where the sharpness is to be enhanced also in image areas which contain edges or the like the problem arises that in this cases in the process of sharpness enhancement also noise contained in the image is amplified.

SUMMARY OF THE INVENTION

It is an object underlying the present invention to provide a method for processing digital image data which is capable of inherently improving image sharpness with-out increasing image noise in areas which contain edges.

The object underlying the present invention is achieved by a method for processing digital image data according to the present invention with the features of independent claim 1. Preferred embodiments of the method for processing digital image data according to the present invention are within the scope of the respective dependent sub-claims. The object underlying the present invention is also achieved by a system, apparatus or device for processing digital image data, by a computer program product as well as by a computer readable storage medium according to independent claims 34, 35, and 36, respectively.

According to the present invention a method for processing digital image data is provided which comprises (a) a step S1 of providing digital image data to be processed as input data, said digital image data being representative for at least one of an image, a sequence of images and a video, (b) a step S2 of processing said input data, thereby generating processed image data as processed data, said processed image data being representative for an respective one of a processed image, a processed sequence of images and a processed video, said processed image, a processed sequence of images and a processed video, having enhanced sharpness properties, and (c) a step S3 of providing said process data as output data, wherein said step S2 of processing said input data comprises a process of detecting and enhancing edges and uses a multi rate signal processing, multi resolution signal processing and/or multi scale signal processing with respect to said input data in order to realize the multi rate, multi resolution and/or multi scale sharpness enhancement with respect to said input data.

In addition, according to the present invention a respective system, apparatus, device, a computer program product and a computer readable storage medium are provided.

BRIEF DESCRIPTION OF THE DRAWINGS

The invention will now be explained based on preferred embodiments thereof and by taking reference to the accompanying and schematical figures.

DETAILED DESCRIPTION OF THE INVENTION

Figure 1:
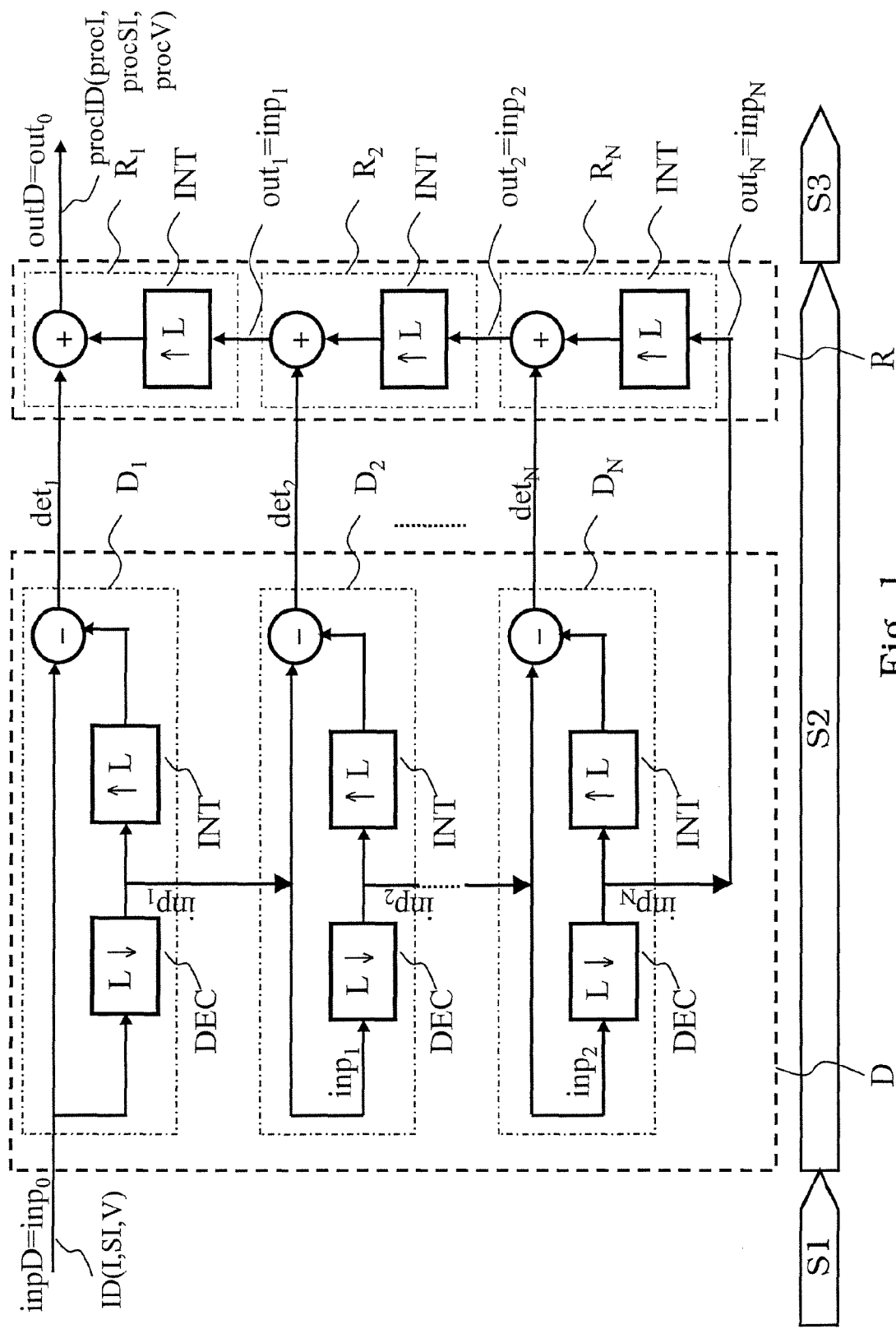
FIG. 1 is a schematical block diagram for elucidating a prior art signal processing method.

In the following functional and structural similar or equivalent elements, structures and/or processes will be denoted with the same reference symbols. Not in each case of their occurrence a detailed description will be repeated.

According to the present invention a method for processing digital image data is provided which comprises (a) a step S1 of providing digital image data ID to be processed as input data inpD, said digital image data ID being representative for at least one of an image (I), a sequence of images SI and a video V, (b) a step S2 of processing said input data inpD, thereby generating processed image data procID as processed data procD, said processed image data procID being representative for an respective one of a processed image procI, a processed sequence of images procS and a processed video procV, said processed image procd, a processed sequence of images procSI and a processed video procV, having enhanced sharpness properties, and (c) a step (S3) of providing said process data procD as output data outD) wherein said step S2 of processing said input data inpD comprises a process of detecting and enhancing edges DEE and uses a multi rate signal processing, multi resolution signal processing and/or multi scale signal processing with respect to said input data inpD in order to realize the multi rate, multi resolution and/or multi scale sharpness enhancement with respect to said input data inpD.

According to a preferred embodiment of the method for processing digital image data according to the present invention said step S2 of processing said input data inpD, said process of detecting and enhancing edges DEE and/or said edge based sharpness enhancement are realized by a process of decomposition D and reconstruction R of said input data inpD.

According to a further alternative or additional embodiment of the method for processing digital image data according to the present invention said step S2 of processing said input data inpD, said process of detecting and enhancing edges DEE, said edge based sharpness enhancement and/or said processes of decomposition D and reconstruction R are realized by a Laplace pyramid decomposition and reconstruction scheme LPDR.

As an alternative or in addition and according to an advantageous embodiment of the method for processing digital image data according to the present invention said step S2 of processing said input data inpD, said process of detecting and enhancing edges DEE, said edge based sharpness enhancement, said processes of decomposition D and reconstruction R and/or said Laplace pyramid decomposition and reconstruction scheme LPDR are based on or use a process of decimation DEC and a process of interpolation/integration INT.

In this case said process of decimation DEC may be based on a multi rate signal processing, multi scale signal processing and/or multi resolution signal processing.

Additionally or alternatively in these cases said process of interpolation/integration INT may be based on a multi rate signal processing, multi scale signal processing and/or multi resolution signal processing.

Said process of decimation DEC may comprise sub-processes of d1 low pass filtering L and/or anti-alias filtering L and of d2 down-sampling $\downarrow$, in particular in that given order.

Said process of interpolation/integration INT may comprise sub-processes of i1 up-sampling $\uparrow$ and of i2 low pass filtering L and/or anti-alias filtering L, in particular in that given order.

Said process of decimation DEC and/or said process of interpolation/integration INT and in particular the respective sub-processes d1, d2, i1, i2 thereof may be carried out in order to reduce high frequency components, noise components and/or respective variances thereof and in order to keep the useful signal components of respective intermediate signals essentially unchanged or to reduce said useful components of respective intermediate signals only by a comparable smaller amount or by a comparable small amount, or unchanged.

Said process of decimation DEC and/or said process of interpolation/integration INT and in particular the respective sub-processes d1, i2 of low pass filtering L and/or of anti-alias filtering L may be based on a windowing process, in particular are based on a Hamming window.

Said process of decimation DEC and/or said process of interpolation/integration INT and in particular the respective sub-processes d1, i2 of low pass filtering L and/or of anti-alias filtering L may be pre-estimated based on a transfer function H given by said low pass filter and/or by said anti-alias filter which is involved.

In this case the respective transfer function H of the underlying filter L may be used in order to define at least one of a change factor, a variance range and a variance tolerance range in order to decide whether an area or signal component of a said signal to be classified is dominated by high frequency signal components or noise.

Said step S2 of processing said input data inpD, said process of detecting and enhancing edges DEE, said edge based sharpness enhancement, said processes of decomposition D and reconstruction R, said Laplace pyramid decomposition and reconstruction scheme LPDR and/or said process of decimation DEC and said process of interpolation/integration INT may be realized iteratively with a multiplicity of iteration steps $k=1, \ldots, N$.

In each of said iteration steps $k=0, 1, \ldots, N$ a detail signal $det_k$ may be generated.

Said iteration and in particular a respective iteration stop condition thereof may be based on respective threshold values and/or on respective threshold conditions, in particular in a predefined manner.

In each iteration step $k=1, \ldots, N$ a respective decomposition step $D_k$ and a respective reconstruction step $R_k$ may be performed within said process of decomposition DEC and within said process of reconstruction REC, respectively.

In each iteration step $k=1, \ldots, N$ a respective decomposition step $D_k$ may be adapted in order to receive input data $in_k$ from and generated by an—in particular directly—preceding iteration step k−1 or said input data inpD if no iteration step is preceding.

In each iteration step $k=1, \ldots, N-1$ a respective decomposition step $D_k$ may generate and may provide input data $inp_{k+1}$ for/to a decomposition step $D_{k+1}$ of an—in particular directly—succeeding or following iteration step k+1 or output data $out_k$ for/to a respective reconstruction step $R_k$ of the same iteration step k if no iteration step is succeeding.

In each iteration step $k=1, \ldots, N-1$ a respective decomposition step $D_k$ may be adapted in order to generate and provide said input data $in_{k+1}$ according to equations (1) and (2)

$$inp_k := DEC(inp_{k-1}) = \downarrow(L(inp_{k-1})) \text{ for } k=1, \ldots, N \quad (1)$$

$$inp_0 := inpD, \quad (2)$$

wherein inpD denotes the input data of the whole process, $inp_k$ denotes the input data for the k-th iteration step, DEC($\bullet$) denotes the decimation process, $\downarrow(\bullet)$ denotes the down sampling process d2, and L($\bullet$) denotes the low pass filtering and/or anti-aliasing filtering process d1.

In each iteration step $k=1, \ldots, N$ a respective decomposition step $D_k$ may be adapted in order to generate and provide detail data $det_k$ for/to a respective reconstruction step $R_k$ of the same iteration step k.

In each iteration step $k=1, \ldots, N-1$ a respective decomposition step $D_k$ may be adapted in order to generate and provide said detail data $det_k$ according to one of the cases (a), (b) and (c) of equations (3)

$$det_k := \begin{cases} DEE(inp_{k-1}) - INT(inp_k) = DEE(inp_{k-1}) - L(\uparrow(inp_k)) & (a) \\ inp_{k-1} - DEE(INT(inp_k)) = in_{k-1} - DEE(L(\uparrow(inp_k))) & (b) \\ inp_{k-1} - INT(inp_k) = inp_{k-1} - L(\uparrow(inp_k)) & (c) \end{cases} \quad (3)$$

for $k=1, \ldots, N$, wherein $det_k$ denotes the detailed data of the k-th iteration step, $inp_k$ denotes the input data for the k-th iteration step, INT($\bullet$) denotes the process of interpolation/integration, DEE($\bullet$) denotes the process of determination and enhancing edges, $\uparrow(\bullet)$ denotes the up sampling process i1, and L($\bullet$) denotes the low pass filtering and/or anti-aliasing filtering process i2.

In each iteration step $k=1, \ldots, N$ a respective reconstruction step $R_k$ may be adapted in order to receive detail data $det_k$ from and generated by a respective decomposition step $D_k$ of the same iteration step k and output data $out_k$ from and generated by a respective reconstruction step $D_{k+1}$ of an—in particular directly—succeeding iteration step k+1 or said input data $in_k$ of said decomposition step $D_k$ of the same iteration step if no iteration step is succeeding.

In each iteration step $k=1, \ldots, N-1$ a respective reconstruction step $R_k$ may be adapted in order to generate and provide output data $out_{k-1}$ for a and to a reconstruction step $R_{k-1}$ of an—in particular directly—preceding iteration step k−1 or output data outD for the whole process if no iteration step is preceding.

In each iteration step $k=1, \ldots, N-1$ a respective reconstruction step $R_k$ may be adapted in order to generate and provide and/or to receive said output data $out_k$ according to one of the cases (a), (b) and (c) of equation (5) and according to equation (4) and (6):

$$out_0 := outD, \quad (4)$$

$$out_{k-1} := \quad (5)$$
$$\begin{cases} det_k + INT(out_k) = out_k + L(\uparrow(out_k)) & (a), (b) \\ det_k + DEE(INT(out_k)) = det_k + DEE(L(\uparrow(out_k))) & (c) \end{cases}$$

$$out_N := inp_N, \quad (6)$$

for k=2, ..., N, wherein $out_k$ denotes the output data for/to the k-th iteration step, $inp_k$ denotes the input data for the k-th iteration step, INT(•) denotes the process of interpolation/integration, DEE(•) denotes the process of determination and enhancing edges, ↑(•) denotes the up sampling process i1, and L(•) denotes the low pass filtering and/or anti-aliasing filtering process i2.

Said edge detection DEE may be carried out from the original input signal inpD and the decimator DEC output on the decomposition side D of a multi rate signal processing.

Said edge detection DEE may be carried out from the output of the interpolator INT on the decomposition side D of a multi rate signal processing.

Said edge detection DEE may be carried out from the output of the interpolator INT on the reconstruction side R of a multi rate signal processing.

Said process of detecting and enhancing edges DEE may be based on a process of edge-based image sharpness enhancement.

Said process of detecting and enhancing edges DEE may be based on a process of non edge-based image sharpness enhancement.

Said edge detection and enhancement may be carried out on the basis of multi-resolution signal processing, and then enhanced by an edge-based sharpness enhancement method.

For edges that cannot be detected on a higher resolution level they may be detected on a lower resolution level, and therefore further enhanced.

The edge detection on different resolution levels may be done using different or the same edge threshold value.

The edge enhancement amounts on different resolution levels may be controlled so that different signal parts can be emphasized in a controlled manner.

In the context of the present invention, any known process for detecting and enhancing edges DEE may be involved.

According to a further aspect of the present invention a system, apparatus, or device for processing digital image data is provided which is adapted and which comprises means for carrying out a method for processing digital image data according to the present invention and the steps thereof.

According to a further aspect of the present invention a computer program product is provided which comprises a computer program means which is adapted in order to carry out the method for processing digital image data according to the present invention and the steps thereof when it is carried out on a computer or a digital signal processing means.

According to a still further aspect of the present invention a computer readable storage medium is provided which comprises a computer program product according to the present.

These and further aspects of the present invention will be further discussed in the following:

The present invention in particular also relates to a method for edge-based multi rate image sharpness enhancement.

This present invention inter alia discloses a nonlinear sharpness enhancement method that is based on multi rate signal processing. Because the edge-based sharpness enhancement method can well prevent image noise from being amplified and is effective for image sharpness improvement it is applied to the multi rate image sharpness enhancement. Because of the multi rate processing, not only edges being of large gradients but also edges with middle and small gradients can be effectively detected so that are further enhanced.

Image sharpness is besides image resolution another important feature for image quality evaluation. Image sharpness enhancement is an important topic of image processing. Among numerous image sharpness enhancement methods, the edge-based ones have been proved as most promising [Sch00]. It not only enhances the image sharpness, but also well prevents noise from being amplified. For the edge-based image sharpness enhancement method, the image edges will be at first detected, then, the pixels along the edge are enhanced.

The subject—multi rate signal processing, which is also known as multi scale or multi resolution signal processing, has been addressed by numerous authors, for instance [CroRa96, Vaid93, AkanHa90]. Its application finds in many areas. One of the important application is sharpness enhancement [VuySch91]. It is based on the pyramid decomposition. In higher resolution levels, the signal parts with higher gradient are enhanced. In lower resolution levels, the signal parts with lower gradient are enhanced. In this way, all or most of the signal structures can be enhanced, whereas only the signal structures with higher gradient are enhanced by the traditional non multi rate signal processing method.

A method for improving the sharpness of pictures contained in a video signal comprises the steps of: a) processing said pictures on the basis of a step/edge enhancement algorithm to obtain step/edge enhanced pictures, b) processing said pictures on the basis of a texture enhancement algorithm to obtain texture enhanced pictures, and mixing said step/edge enhanced pictures with said texture enhanced pictures to obtain a video signal containing sharpness-improved pictures, wherein steps a) and b) are performed in dependence of motion information being related to said pictures. For details, please refer to "Method and Apparatus for Improving Picture Sharpness", EP 1 339 224.

Because especially the low contrast structures need to be enhanced, the multi rate image sharpness enhancement method is the most efficient one with respect to image sharpness improvement. However, the current multi rate image sharpness enhancement method is noise-sensitive, and even very noise-sensitive. The current edge-based image sharpness enhancement methods can well prevent noise from being amplified, but are not efficient for low contrast structures.

This invention aims at improving the sharpness of image signals with low, middle and higher contrast as well as simultaneously preventing the image noise from being amplified. The noise sensitivity problem will be significantly reduced when one combines the multi rate signal processing with the edge-based image enhancement method.

The well-known multi rate signal processing method Laplace pyramid decomposition and reconstruction is shown in FIG. 1.

The multi rate image enhancement [VuySch91] takes place with the detail signal. Because the detail signal itself is high frequency component, its amplification, i.e. multiplying with a factor that is larger than one, leads to image sharpness enhancement. Together with sharpness improvement, this kind of sharpness enhancement method will also amplify the image noise, because image noise is also contained in the detail signal. Although measures against noise over-amplification have been taken, e.g. the well-known coring technique, the noise amplification problem remains.

Figure 2:
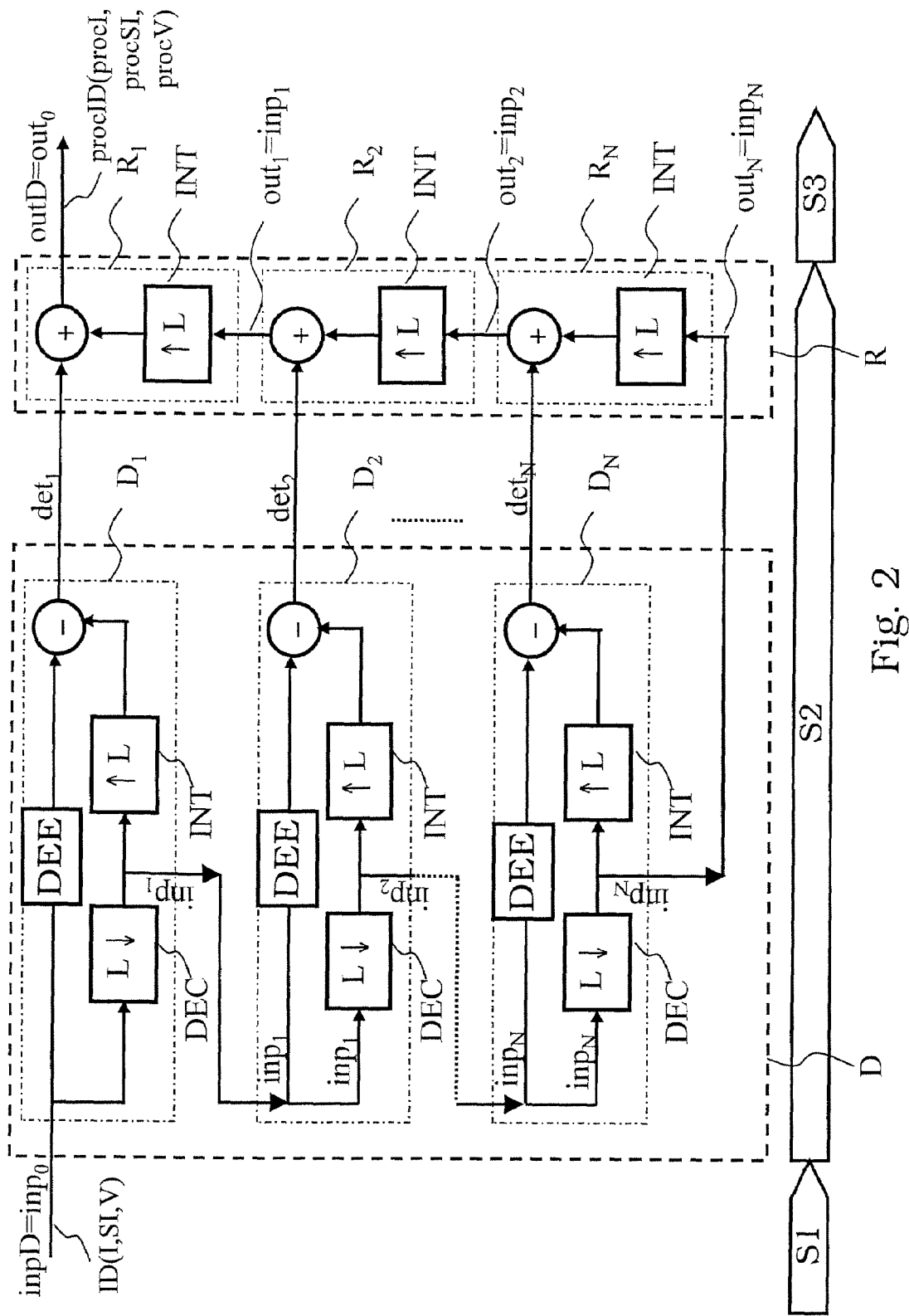
FIG. 2 is a schematical block diagram for elucidating a first embodiment of the inventive method for processing digital image data and in particular the edge-based multi rate image enhancement.

Therefore, this invention discloses another method, namely the edge-based multi rate image sharpness enhancement, as shown by FIG. 2.

From the highest resolution level signal (original input) and the lower resolution level signals, the edges are at first detected. The lower resolution level signal is the output of the decimator consisting of a low pass filter (L) and a down-sampler ($\downarrow$). There is edge detection method, which is robust against noise disturbance [Sch00]. The pre-processing for edge detection, i.e. the orthogonal filtering, can additionally improve the robustness of edge detection against noise disturbance. Pixels along the detected edges will then be enhanced by for instance the edge replacement method, the synthetic detail-signal addition method [Sch00].

FIG. 2 shows that the edge detection and enhancement are done using the output of the decimator DEC which is L $\downarrow$. One can also enhance the image sharpness using the output of the interpolator or integrator INT which is $\uparrow$ L consisting of an up-sampler $\uparrow$ and a low pass filter L, in particular, using the output of the interpolator on the reconstruction side is promising.

Figure 3:
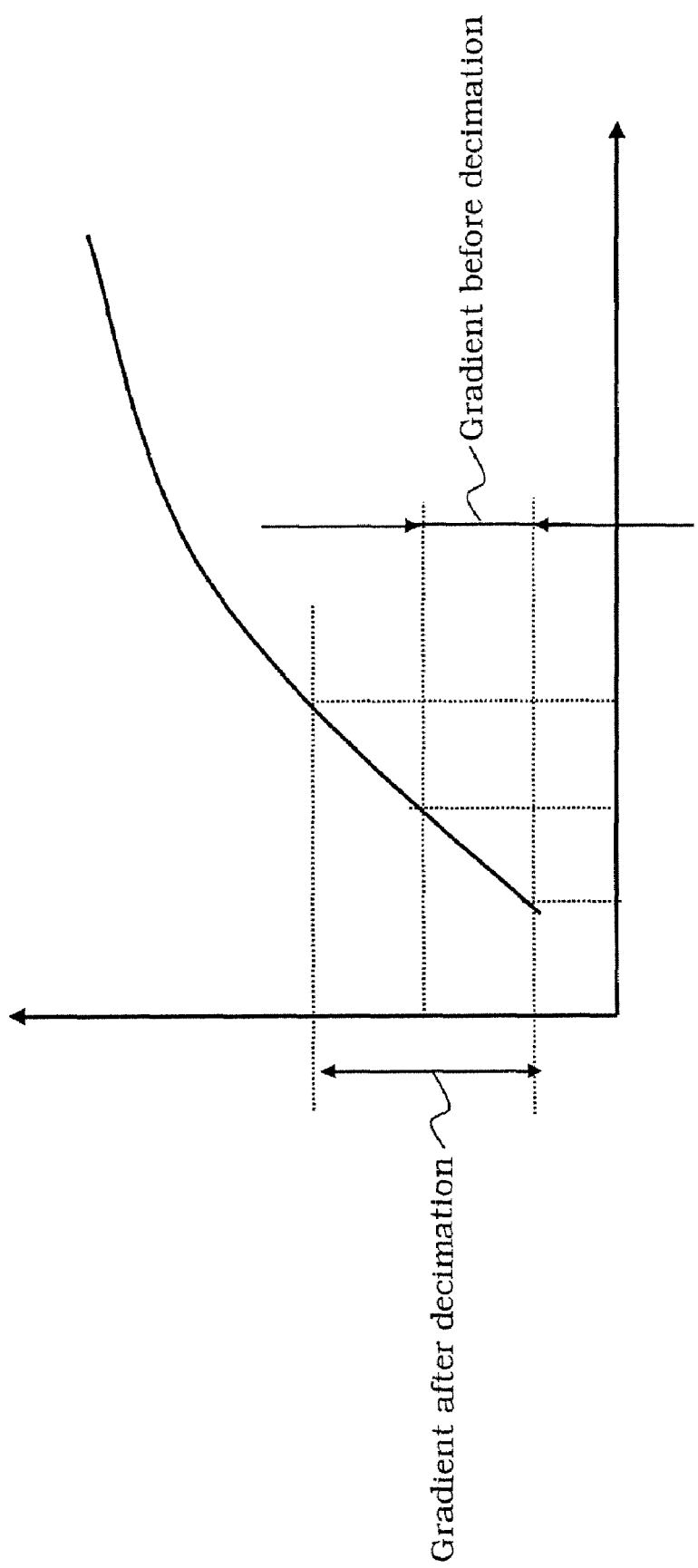
FIG. 3 demonstrates by means of a graphical representation the change of a gradient of an edge according to a process of decimation according to the present invention.

The edge gradient will become larger after decimation, referring to FIG. 3. As result, the edges that cannot be detected on a higher resolution level can be detected on a lower resolution level, although the same threshold value for edge detection is applied. Another advantage of the multi rate processing is that for the same image one can apply more than one threshold values for edge detection, i.e. on different level one applies different threshold value for edge detection. This in turn helps to improve the edge detection result.

Therefore, the edges that cannot be enhanced on a higher resolution level using the edge-based enhancement method can be enhanced on a lower resolution level. Consequently, not only signal parts with high contrast, but also signal parts with low, middle contrast can be enhanced.

Besides, the signal enhancement amount can be different on different level so that one can emphasize different signal parts. For instance, one can emphasize the signal part with lower contrast by enhancing the lower resolution level stronger than higher resolution level.

This invention inter alia describes an image sharpness enhancement method which is characterized in that the edge detection may be carried out from the original input signal and the decimator output on the decomposition side of a multi rate signal processing. The edges detected in this way are enhanced using either an edge-based or not edge-based image sharpness enhancement method.

Alternatively, the edge detection may be carried out from the output of the interpolator on the decomposition side of a multi rate signal processing. The edges detected in this way are enhanced using either an edge-based or not edge-based image sharpness enhancement method.

Further alternatively, the edge detection may be carried out from the output of the interpolator on the reconstruction side of a multi rate signal processing. The edges detected in this way are enhanced using either an edge-based or not edge-based image sharpness enhancement method.

The image sharpness enhancement method may further additionally or alternatively be characterized in that the edge detection may be carried out on the basis of multi resolution signal processing, and then enhanced by an edge-based sharpness enhancement method.

According to a further aspect of the present invention it is provided that if the edges cannot be detected on a higher resolution level they can be detected on a lower resolution level, and therefore further enhanced.

According to still a further aspect an image sharpness enhancement method is provided which characterized in that the edge detection on different resolution levels can be done using different or the same edge threshold value.

Additionally or alternatively, the edge enhancement amounts on different resolution levels may be controlled so that one can emphasize different signal parts.

The disclosed method combines the advantage of multi rate signal processing and the edge-based image enhancement. It improves the sharpness of image signals with low, middle and higher contrast as well as prevents the noise from being amplified.

FIG. 1 is a schematical block diagram which exemplifies details of a common method for processing digital image data which are given as input data inpD in order to generate and provide output data outD.

The whole process is formed by a sub-process of decomposing D said input data inpD and a sub-process of reconstruction R in order to obtain said output data outD.

In addition the whole process may be formed iteratively as well as each of said sub-processes for decomposition D and for reconstruction R. For each iteration step k=1, . . . , N the input data $inp_{k-1}$ for that particular iteration step k are given or generated and respective output data $out_{k-1}$ of that particular iteration step k are generated.

Initially, i.e. the input data $inp_0$ for the initial or first iteration step k=1 are given by the input data inpD of the whole process. For each following iteration step k+1 the respective input data $inp_k$ formed by the iteration process k in progress and is in each case obtained by first applying a low pass or anti-aliasing filter L and then a down-sampling process $\downarrow$ to the supplied input data $inp_k$.

For each iteration step k the respective output data $out_k$ is generated in dependence from the output data $out_{k+1}$ of the following iteration step k+1, i.e. by adding to the so-called detail data or detail signal $det_k$ the output data $out_{k+1}$ to which at first an up-sampling process $\uparrow$ and at second a low pass or anti-aliasing filtering L are applied to.

The concatenation of low pass or anti-aliasing filtering L and of down-sampling in $\downarrow$ on the one hand and of applying the concatenation of an up-sampling process $\uparrow$ and of an low pass filtering or anti-aliasing filtering L are referred to as decimation processes DEC and as integration or interpolation processes INT, respectively.

For each iteration step k the respective detail data $det_k$ or detail signal $det_k$ is generated by applying to the respective input signal $inp_{k-1}$ for the respective iteration step k a subtraction or inverted data which are obtained by applying to the respective input data $inp_{k-1}$ in the given order a low pass or anti-aliasing filter process L, a down-sampling process $\downarrow$, an up-sampling process $\uparrow$ and a low pass or anti-aliasing process L.

FIG. 2 is a further schematical block diagram showing an example of a preferred embodiment of the inventive method for processing digital image data which differs from the scheme shown in FIG. 1 by having included in each iteration step a process of detecting and enhancing edges DEE which is applied to the respective input data $inp_k$ at each iteration level k in order to derive the detail signal $det_k$ or detail data $det_k$.

In the case of FIG. 2 the process of detecting and enhancing an edge DEE is directly applied to the respective input data $inp_{k-1}$ for a given iteration level k such that the respective detail signal $det_k$ or detail data $det_k$ are defined as the difference between the input data $inp_{k-1}$ to which the process of detecting and enhancing an edge DEE is applied and the respective input data $inp_{k-1}$ to which the cascade of processes comprising a low pass filter or anti-aliasing filter L, a down-sampling process ↓, an up-sampling process ↑ and a low-pass filter or anti-aliasing filter L again in this order is applied.

Respective relations for the input data $inp_k$ and the output data $out_k$ apply in a similar way as with respect to FIG. 1.

FIG. 3 is a graphical representation which demonstrates the increase of a gradient, for instance of an edge in the image data before and after gradient decimation processes DEC to be applied in accordance to the present invention.

Figure 4:
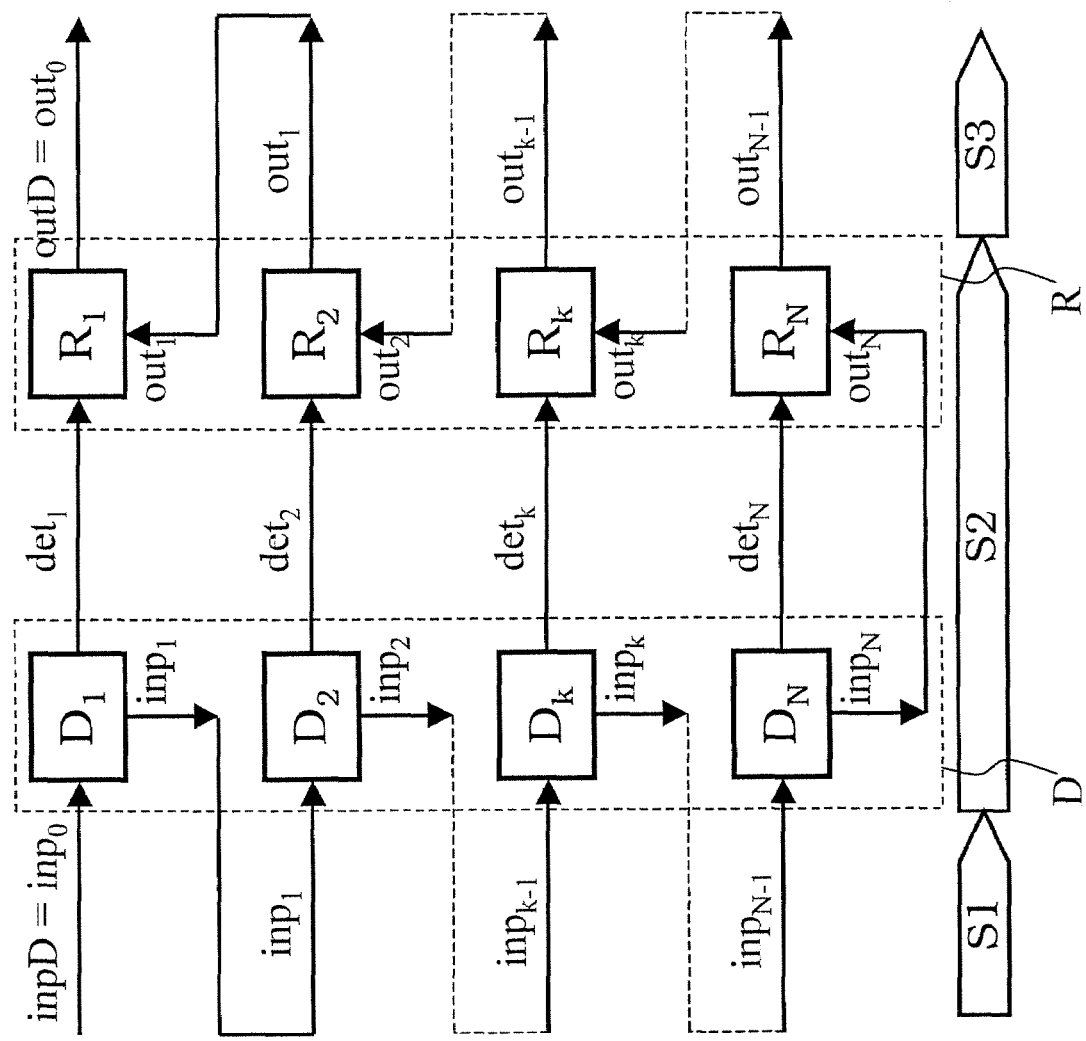
FIG. 4 is a schematical block diagram for elucidating the general inventive concept for a iterative process behind the inventive method for processing image data.

FIG. 4 is a further schematical block diagram which elucidates the basic structure of the iterate process according to a preferred embodiment of the present invention and shows the different relationships between the decomposition steps $D_k$ and reconstruction steps $R_k$.

Figure 5:
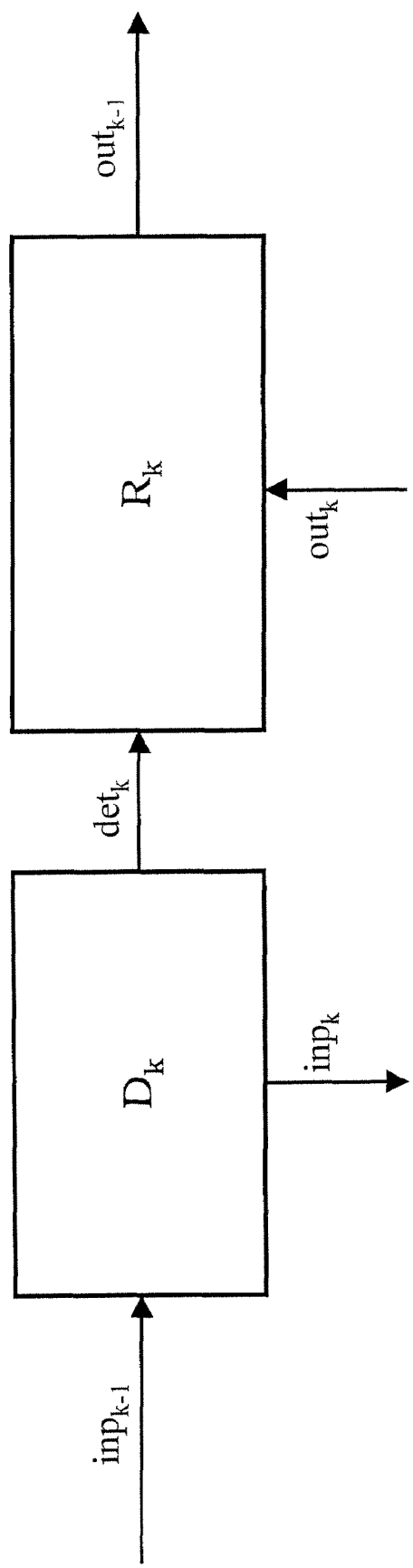
FIG. 5 is a schematical block diagram for elucidating details of each iteration step of the process shown in FIG. 4 in more detail.

FIG. 5 illustrates the relationships of the different sub-processes and the data $inp_{k-1}$, $inp_k$, $det_{k-1}$, $det_k$, $out_{k-1}$, $out_k$ with respect to each other and with respect to the sub-processes $D_k$ of decomposition and $R_k$ of a reconstruction of each iterative level k.

Figure 6A:
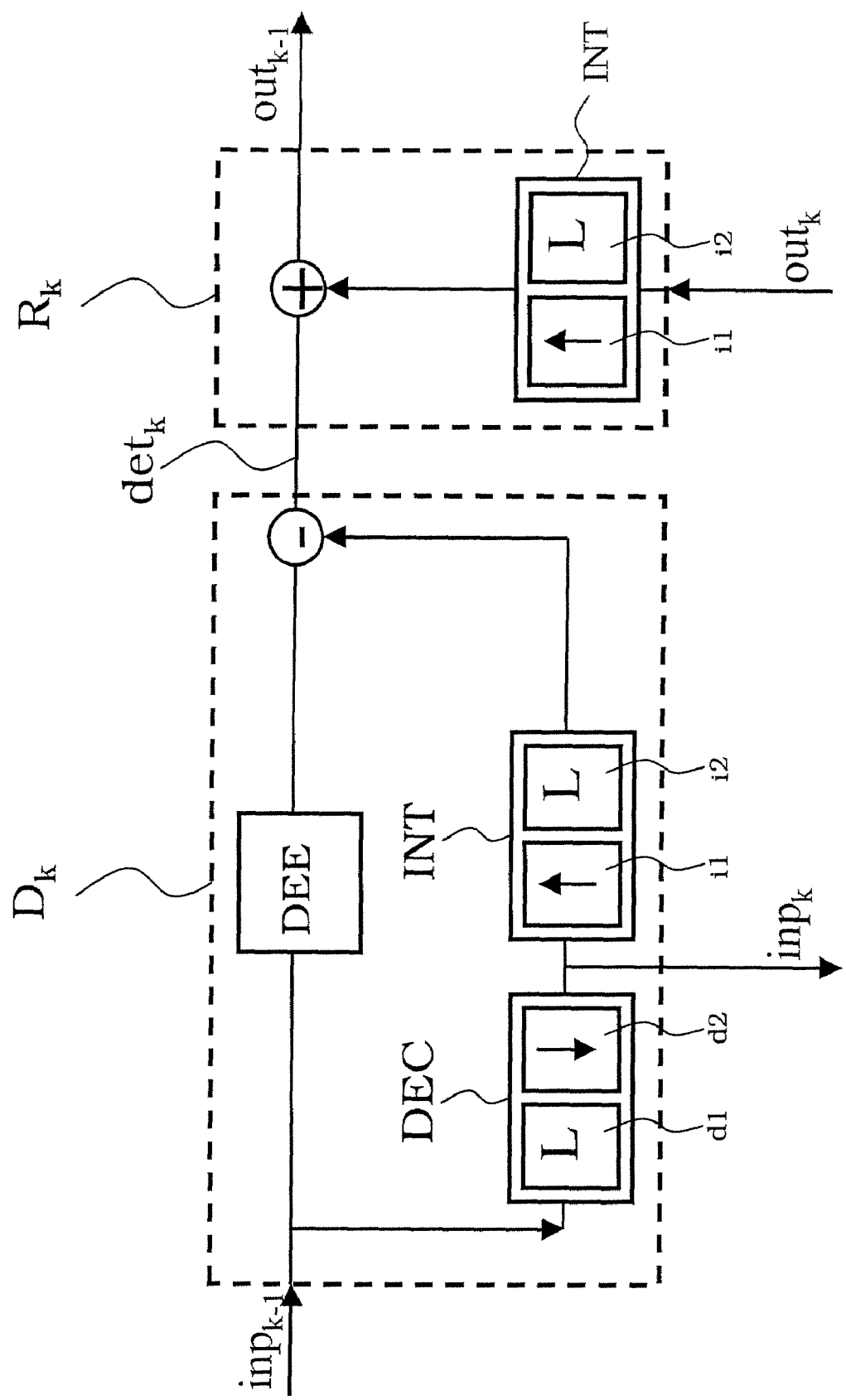
FIGS. 6A-C are schematical block diagrams for elucidating details of the structure of the iteration step shown in FIG. 5 for different embodiments of the inventive method for processing digital image data.
Figure 6B:
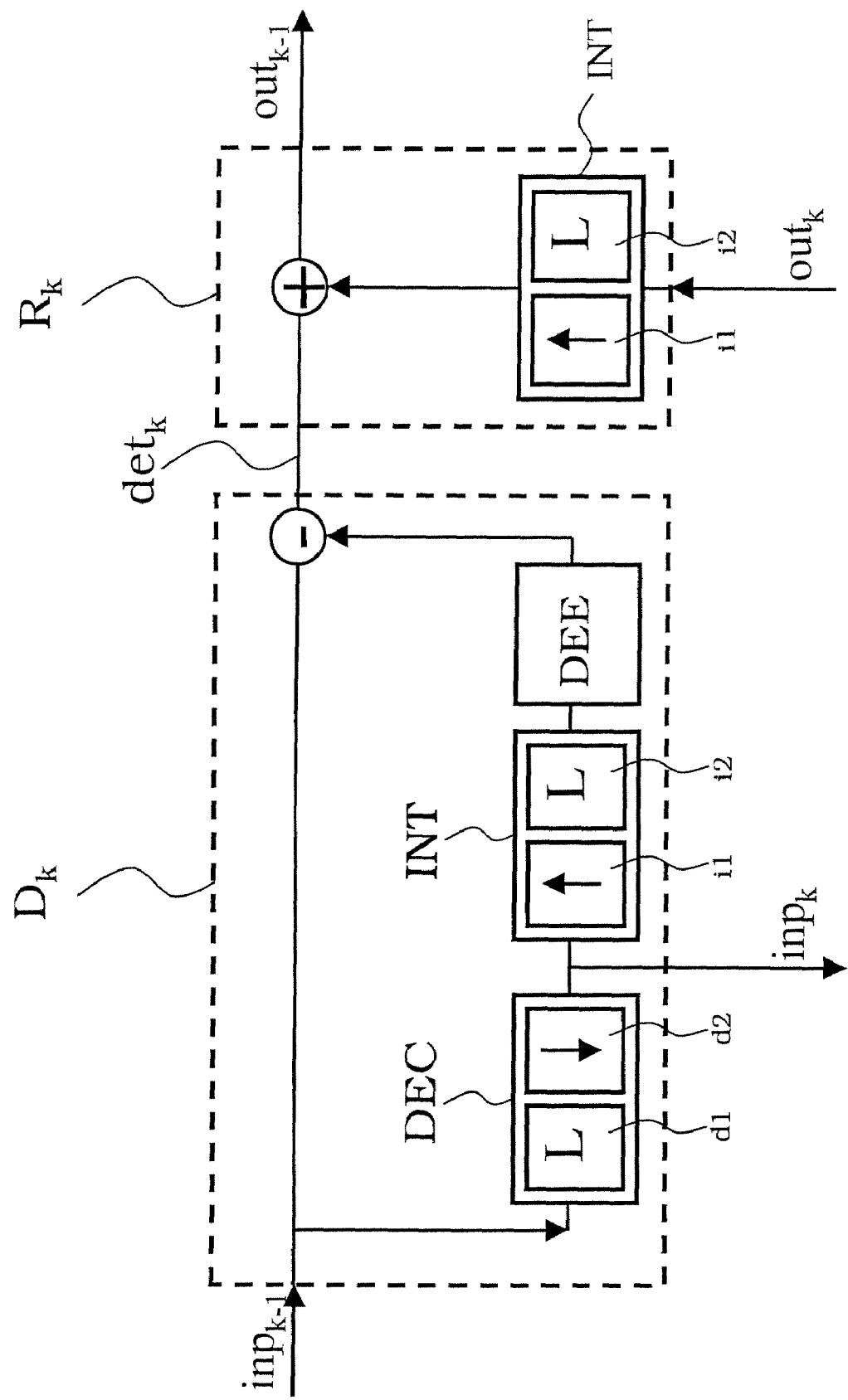
Figure 6C:
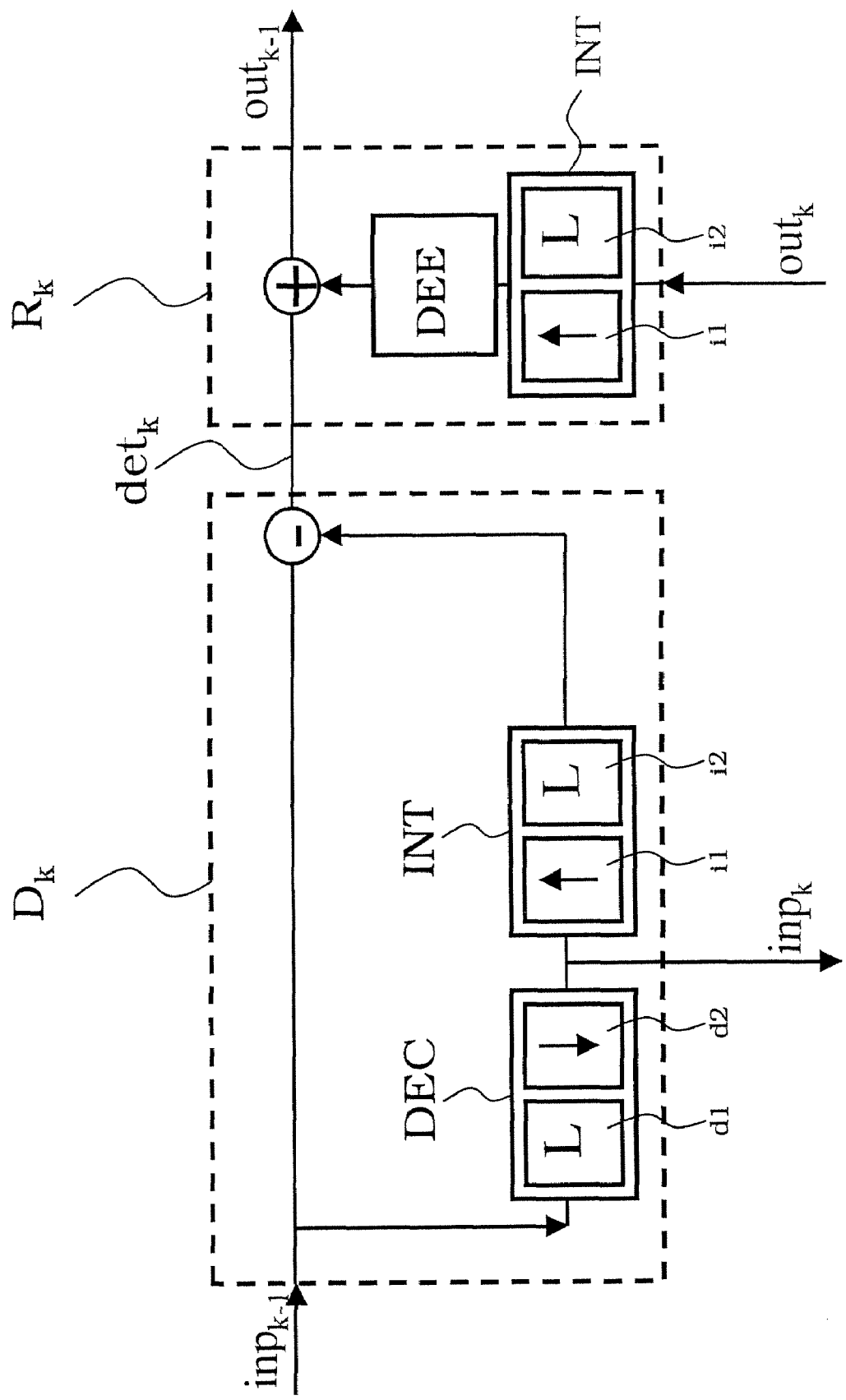

FIGS. 6A to 6C demonstrate by means of schematical block diagrams again the general relationships demonstrated by FIG. 5, however, with different realizations regarding the process of detecting and enhancing edges DEE.

In FIG. 6A a comparable situation as demonstrated in FIG. 2 is shown for a single iteration step k. Here it is again elucidated that the process of detecting and enhancing an edge DEE may be applied to the input data $inp_{k-1}$ provided for a given iteration step k.

In the embodiment according to FIG. 6B the process of detecting and enhancing edges DEE is directly applied to the out coming signal of the integration or interpolation process INT for each iteration level k.

In the embodiment shown in FIG. 6C the process of detecting and enhancing edges DEE is transferred from the decomposition part $D_k$ to the reconstruction part $R_k$ of each iteration level k, i.e. it is applied to the output signal or output data $out_k$ received by the $k^{th}$ iteration level after the integration/interpolation process INT has been applied to, i.e. after the application of the up-sampling process ↑ and the low pass or anti-aliasing filter process L and right before the summation with a detail signal or a detail data $det_k$.

CITED REFERENCES

[Burt81] P. J. Burt, "Fast Filter Transforms for Image Processing", Computer Graphics and Image Processing, Vol. 16, 1981.

[Crow84] J. L. Crowley, R. M. Stern, "Fast Computation of the Difference of Low-Pass Transform", IEEE Trans. on Pattern Analysis and Machine Intelligence, Vol. 6. No. 2, 1984.

[AkanHa90] A. N. Akansu, R. A. Haddad, "Multiresolution Signal Decomposition", ISBN: 0120471418. Academic Press, 1990.

[VuySch91] Pieter Paul Vuylsteke, Emile Paul Schoeters, "Method and Apparatus for Contrast Enhancement", EP 527 525, 1991.

[Vaid93] P. P. Vaidyanathanm, "Multirate Systems and Filter Banks", ISBN: 0-13-605718-7. Prentice Hall PTR, 1993.

[CroRa96] Lawrence R. Rabiner, Ronald E. Crochiere, "Multirate Digital Signal Processing", ISBN: 0136051626. Prentice Hall Signal Processing Series, 1996.

[Sch00] H. Schröder, "Mehrdimensionale Signalverarbeitung", ISBN: 3-519-06197-X, B. G. Teubner Stuttgart•Stuttgart, 2000.

REFERENCE SYMBOLS

D process of decomposition
$D_k$ process of decomposition for each iteration level k
DEC process of decomposition
$det_k$ detail data/detail signal for each iteration level k
DEE process of detecting and enhancing edges
$inp_k$ input data for a respective iteration level k
inpD input data for the whole process/method
inpI input image for the whole process/method
inpSI input sequence of images for the whole process/method
inpV input video for the whole process/method
INT integration/interpolation process
$out_k$ output data from a succeeding iteration level k for a preceding iteration level k−1
outD output data of the whole process/method
procD processed data for the whole process/method
procI processed image for the whole process/method
procSI processed sequence of images for the whole process/method
procB processed video for the whole process/method
R reconstruction process
$R_k$ reconstruction process for a respective iteration level k

The invention claimed is:

1. A method of processing digital image data performed by an apparatus for processing digital image data, the method comprising:
    processing, at a processor of said apparatus for processing digital image data, said digital image data based on multi rate signal processing, multi resolution signal processing and/or multi scale signal processing to enhance sharpness properties, wherein
    said processing includes decomposing and reconstructing said digital image data, and
    said decomposing includes:
        performing a process of decimation,
        performing a process of interpolation/integration based on an output of said process of decimation,
        performing a process of detecting and enhancing edges, and
        generating a detail signal depending on an output of said process of detecting and enhancing edges and on an output of said process of interpolation/integration, and
    said reconstructing includes
        using said detail signal as an input.

2. The method according to claim 1,
    wherein said decomposing and reconstructing are realized by a Laplace pyramid decomposition and reconstruction scheme.

3. The method according to claim 2,
    wherein said processing of said digital image data, said process of detecting and enhancing edges, said processes of decomposing and reconstructing of said Laplace pyramid decomposition and reconstruction scheme are based on said process of decimation and said process of interpolation/integration.

4. The method according to claim 3,
    wherein said process of decimation is based on multi rate signal processing, multi scale signal processing and/or multi resolution signal processing.

5. The method according claim 3,
wherein said process of interpolation/integration is based on multi rate signal processing, multi scale signal processing and/or multi resolution signal processing.

6. The method according to claim 3,
wherein said process of decimation comprises sub-processes of:
low pass filtering and/or anti-alias filtering; and
down-sampling,
in that given order.

7. The method according to claim 3,
wherein said process of interpolation/integration comprises sub-processes of:
up-sampling; and
low pass filtering and/or anti-alias filtering,
in that given order.

8. The method according to claim 3,
wherein said process of decimation and/or said process of interpolation/integration are performed to reduce high frequency components, noise components or respective variances thereof, and to keep useful signal components of respective intermediate signals essentially unchanged or to reduce said useful signal components of respective intermediate signals only by a comparable small amount.

9. The method according to claim 3,
wherein said process of decimation or said process of interpolation/integration and respective sub-processes of low pass filtering or of anti-alias filtering are based on a windowing process.

10. The method according to claim 3,
wherein said process of decimation and/or said process of interpolation/integration and respective sub-processes of low pass altering and/or of anti-alias filtering are pre-estimated based on a transfer function given by a low pass filter or by an anti-alias filter which is involved.

11. The method according to claim 10,
wherein the respective transfer function of the underlying filter is used to define at least one of a change factor, a variance range and a variance tolerance range to decide whether an area or signal component of said signal to be classified is dominated by high frequency signal components or noise.

12. The method according to claim 3,
wherein at least one of said step of processing said digital image data, said processes of decomposing and reconstructing, said Laplace pyramid decomposition and reconstruction scheme, said process of decimation and said process of interpolation/integration is realized iteratively with a multiplicity of iteration steps.

13. The method according to claim 12,
wherein in each iteration step a respective decomposing step and a respective reconstructing step are performed within said process of decomposing and within said process of reconstructing, respectively.

14. The method according to claim 13,
wherein in each of said iteration steps a respective detail signal is generated in the respective decomposing step and used in the respective reconstructing step of the iteration step, said respective detail signal depending on a respective process of detecting and enhancing edges performed within the iteration step.

15. The method according to claim 12,
wherein said iteration and a respective iteration stop condition thereof are based on respective threshold values.

16. The method according to claim 12,
wherein in each iteration step a respective decomposing step receives input data from and generated by a directly preceding iteration step or said digital image data if no iteration step is preceding.

17. The method according to claim 16,
wherein in each iteration step the respective decomposing step generates and provides the input data to a decomposing step of a directly succeeding iteration step or output data to a respective reconstruction step of the same iteration step if no iteration step is succeeding.

18. The method according to claim 17,
wherein in each iteration step the respective decomposing step generates and provides said input data according to equations (1) and (2)

$$inp_k = DEC(inp_{k-1}) = \downarrow(L(inp_{k-1})) \text{ for } k=1,\ldots N \quad (1)$$

$$inp_0 = inpD, \quad (2)$$

wherein inpD denotes the digital image data, $inp_k$ denotes the input data for a k-th iteration step, $DEC(\bullet)$ denotes the decimation process, $\downarrow(\bullet)$ denotes a down sampling process, and $L(\bullet)$ denotes a low pass filtering or anti-aliasing filtering process.

19. The method according to claim 18,
wherein in each iteration step the respective decomposing step generates and provides detail data according to one of the cases (a) and (b) of equation (3)

$$det_k := \begin{cases} DEE(inp_{k-1}) - INT(inp_k) = DEE(inp_{k-1}) - L(\uparrow(inp_k)) & (a) \\ inp_{k-1} - DEE(INT(inp_k)) = inp_{k-1} - DEE(L(\uparrow(inp_k))) & (b) \end{cases} \quad (3)$$

for $k = 1, \ldots, N,$ wherein $det_k$ denotes the detail data of the k-th iteration step, $inp_k$ denotes input data for the k-th iteration step, $INT(\bullet)$ denotes the process of interpolation/integration, $DEE(\bullet)$ denotes the process of determining and enhancing edges, $\downarrow(\bullet)$ denotes an up sampling process, and $L(\bullet)$ denotes a low pass filtering and/or anti-abasing filtering process.

20. The method according to claim 12,
wherein in each iteration step a respective reconstructing step receives detail data from and generated by a respective decomposing step of the same iteration step and output data from and generated by a respective reconstructing step of a directly succeeding iteration step or input data of a decomposing step of the same iteration step if no iteration step is succeeding.

21. The method according to claim 12,
wherein in each iteration step a respective reconstructing step generates and provides output data for and to a reconstructing step of a directly preceding iteration step or output data for the whole process if no iteration step is preceding.

22. The method according to claim 21,
wherein in each iteration step the respective reconstructing step receives said output data according to equation (6) and according to equation (4) and (5):

$$out_0 := outD, \quad (4)$$

$$out_{k-1} := \{ det_k + INT(out_k) = out_k + L(\uparrow(out_k)) \quad (a), (b) \quad (5)$$

$$out_N := inp_N, \quad (6)$$

for k = 2, ... , N, wherein $out_k$ denotes the output data for/to the k-th iteration step, $inp_k$ denotes the input data for the k-th iteration step, INT(•) denotes a process of interpolation/integration, $\downarrow$(•) denotes an up sampling process (i1), and L(•) denotes a low pass filtering and/or anti-aliasing filtering process.

23. The method according to claim 1, wherein edge detection is carried out from the digital image data and a decimator output on a decomposition aide of a multi rate signal processing.

24. The method according to claim 1, wherein edge detection is carried out from an output of an interpolator on the decomposition side of a multi rate signal processing.

25. The method according to claim 1, wherein the process of detecting and enhancing edges is based on a process of edge-based image sharpness enhancement.

26. The method according to claim 1, wherein the process of detecting and enhancing edges is based on a process of non edge-based image sharpness enhancement.

27. The method according to claim 1, wherein edge detection is carried out on the basis of multi-resolution signal processing, and then enhanced by an edge-based sharpness enhancement method.

28. The method according to claim 1, wherein edges that cannot be detected on a higher resolution level are detected on a lower resolution level, and therefore are further enhanced.

29. The method according to claim 1, wherein the edge detection on different resolution levels is done using a different or a same edge threshold value.

30. The method according to claim 1, wherein edge enhancement amounts on different resolution levels are controlled so that different signal parts can be emphasized in a controlled manner.

31. An apparatus for processing digital image data, comprising:
a processor configured to process said digital image data based on multi rate signal processing, multi resolution signal processing and/or multi scale signal processing to enhance sharpness properties, wherein
said process including decomposing and restructuring said digital image data, and
said decomposing includes:
performing a process of decimation,
performing a process of interpolation/integration based on an output of said process of decimation,
performing a process of detecting and enhancing edges, and
generating a detail signal depending on an output of said process of detecting and enhancing edges and on an output of said process of interpolation/integration, and
said reconstructing includes
using said detail signal as an input.

32. A tangible non-transitory computer readable storage media including computer program instructions, which when executed by an apparatus for processing digital image data, causes the apparatus to perform a method of processing digital image data, comprising:
processing said digital image data based on multi rate signal processing, multi resolution signal processing and/or multi scale signal processing to enhance sharpness properties, wherein
said processing includes decomposing and reconstructing said digital image data, and
said decomposing includes:
performing a process of decimation,
performing a process of interpolation/integration based on an output of said process of decimation,
performing a process of detecting and enhancing edges, and
generating a detail signal depending on an output of said process of detecting and enhancing edges and on an output of said process of interpolation/integration, and
said reconstructing includes
using said detail signal as an input.

\* \* \* \* \*